(12) United States Patent
Kothari et al.

(10) Patent No.: US 10,320,519 B1
(45) Date of Patent: Jun. 11, 2019

(54) SELECTIVE DISCONTINUATION OF CARRIER AGGREGATION SERVICE TO FACILITATE SERVICE OF OTHER DEVICE

(71) Applicant: Sprint Spectrum L.P., Overland Park, KS (US)

(72) Inventors: Pratik Kothari, Pune (IN); Chunmei Liu, Great Falls, VA (US); Hemanth B. Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 10 days.

(21) Appl. No.: 15/413,050

(22) Filed: Jan. 23, 2017

(51) Int. Cl.
*H04L 1/00* (2006.01)
*H04W 28/02* (2009.01)
*H04W 84/04* (2009.01)

(52) U.S. Cl.
CPC .......... *H04L 1/0005* (2013.01); *H04L 1/0011* (2013.01); *H04W 28/0278* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 9,473,286 B1* | 10/2016 | Shipley | H04L 5/0062 |
| 2013/0039302 A1* | 2/2013 | Miki | H04L 5/001 370/329 |
| 2015/0271755 A1* | 9/2015 | Karri | H04W 52/0229 370/252 |
| 2015/0341945 A1* | 11/2015 | Panchal | H04L 5/003 370/329 |
| 2016/0192255 A1* | 6/2016 | Tsuda | H04W 36/04 370/331 |
| 2016/0302203 A1* | 10/2016 | Liu | H04L 5/001 |
| 2017/0079015 A1* | 3/2017 | Takahashi | H04W 28/14 |
| 2017/0118658 A1* | 4/2017 | Hwang | H04W 76/10 |
| 2018/0054834 A1* | 2/2018 | Lee | H04W 74/085 |

* cited by examiner

*Primary Examiner* — Ajit Patel

(57) ABSTRACT

Methods and systems for controlling service by a base station when the base station is serving both a first UE without carrier aggregation and a plurality of second UEs with carrier aggregation. As a basis for invoking carrier aggregation service for the first UE, the base station selects one of the second UEs to transition from being served by the base station with carrier aggregation to being served by the base station without carrier aggregation. The base station makes such a selection based at least in part on a modulation and coding scheme that the base station uses to serve the selected one of the second UEs. The base station transitions from serving the selected second UE with carrier aggregation to serving the selected second UE without carrier aggregation. And the base station transitions from serving the first UE without carrier aggregation to serving the first UE with carrier aggregation.

20 Claims, 4 Drawing Sheets

SELECTIVE DISCONTINUATION OF CARRIER AGGREGATION SERVICE TO FACILITATE SERVICE OF OTHER DEVICE

BACKGROUND

A typical cellular wireless network includes a number of base stations each radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Such a system may operate in accordance with a particular air interface protocol, examples of which include, without limitation, Orthogonal Frequency Division Multiple Access (OFDMA) (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others.

In accordance with the air interface protocol, a base station may provide service on one or more carriers, each spanning particular radio-frequency on which communications can flow wirelessly between the base station and UEs. Such a carrier could be structured to provide a downlink for carrying communications from the base station to UEs and an uplink for carrying communications from UEs to the base station. For instance, the carrier could be frequency division duplex (FDD), with separate frequency ranges provided respectively for downlink and uplink communication, or time division duplex (TDD), with a single frequency range being time division multiplexed between downlink and uplink use.

Through modulation or other means on the carrier, the downlink and uplink could then be structured to define various channels for carrying communications between the base station and UEs. For instance, the downlink could be structured to define one or more traffic channels for carrying bearer data from the base station to UEs and one or more control channels for carrying control signaling from the base station to UEs. And the uplink could define one or more traffic channels for carrying bearer data from UEs to the base station and one or more control channels for carrying control signaling from UEs to the base station.

Further, data transmitted over the downlink or uplink channels could be modulated according to various modulation and coding schemes (MCSs) having various orders of modulation. Modulating the data with a higher-order MCS could provide for more efficient transmission of the data, thereby helping to increase the effective bandwidth and associated throughput of data over the downlink or uplink channels. For instance, modulating data using 64 Quadrature Amplitude Modulation (64QAM) could allow for a higher transmission rate of the data than modulating the data using a lower-order MCS, such as 16QAM. Likewise, modulating data using 16QAM could allow for a higher transmission rate of the data than modulating the data using an even lower-order MCS, such as Quadrature Phase Shift Keying (QPSK) modulation. Other examples of MCSs can be used to modulate the data as well.

In practice, when a UE enters into coverage of a base station on a particular carrier, the UE may attach or register with the base station on that carrier, and the base station may then serve the UE on that carrier. Further, under certain air interface protocols, a base station may be able to serve a UE concurrently on multiple carriers, to help increase the effective bandwidth and associated throughput available to the UE. For instance, if a UE is attached with a base station on a first carrier, the base station may then add a second carrier to its service of the UE so as to then provide the UE with "carrier aggregation" service on a combination of the first carrier and the second carrier. In that arrangement, the first carrier may be considered the UE's primary carrier or primary cell (PCell), and the second carrier may be considered the UE's secondary carrier or secondary cell (SCell). Depending on the carrier aggregation implementation, the SCell might be used principally for downlink communication (to increase the UE's downlink throughput) rather than for uplink communication, and the PCell may carry some or all control signaling related to the SCell (in addition to control signaling related to the PCell).

OVERVIEW

In a system as described above, a base station serving a UE on a single carrier could be configured to invoke carrier aggregation service for the UE in response to various trigger events. One such trigger event could include the carrier becoming significantly congested. For instance, the carrier could have a limited capacity of air interface resources on which data can be transmitted between the base station and the UE. If a quantity of data that is ready for transmission on the carrier exceeds the capacity of the carrier's available air interface resources, then any excess data could be temporarily stored in a data buffer until additional air interface resources become available. This could add significant delay to transmission of the buffered data, thereby resulting in a poor user experience. Invoking carrier aggregation, however, could increase the quantity of available air interface resources by allowing the data to be transmitted on multiple carriers. With additional capacity more readily available for use in transmitting the data, transmission of the data can in turn more readily occur, thereby reducing the amount of data accumulated in the data buffer. Accordingly, a base station could be configured to invoke carrier aggregation for a UE responsive to the base station detecting threshold high congestion on an air interface between the base station and the UE.

Using carrier aggregation to serve a UE could require a significant amount of processing power. Thus, due to limitations of the base station's processing power, the quantity of UEs that the base station serves at any given time using carrier aggregation (referred to herein as "carrier-aggregation-UEs" or "CA-UEs") could be limited to a maximum quantity. In such an arrangement, when a base station is currently serving the maximum quantity of CA-UEs and the base station detects a trigger event to invoke carrier aggregation service for a single-carrier-UE, the base station could disable carrier aggregation services for one of the CA-UEs in order to facilitate the base station providing carrier aggregation services to the single-carrier-UE.

In practice, the base station could use a variety of considerations as a basis for selecting which one of the CA-UEs for which the base station should disable carrier aggregation service. In accordance with the present disclosure, the base station could select a particular CA-UE based on the MCS that the base station uses to serve the particular CA-UE. As noted above, serving a UE using a higher-order MCS can provide similar benefits as serving a UE using carrier aggregation, in that both can increase the data throughput between the base station and the UE. As such, a UE served with a higher-order MCS could be in less need of carrier aggregation in order to avoid or reduce congestion on the air interface between the UE and the base station. Accordingly, the base station could select the particular CA-UE based at least in part on the base station serving the CA-UE with an MCS having at least a threshold high modulation order.

Once the base station selects one of the CA-UEs, the base station could disable carrier aggregation for the selected UE by transitioning from serving the selected UE on multiple carriers to serving the selected UE on a single carrier. Such a transition would reduce the number UEs that the base station serves using carrier aggregation to a quantity that is less than the base station's maximum quantity of CA-UEs. Thus, after disabling carrier aggregation for the selected CA-UE, the base station could invoke carrier aggregation for the single-carrier-UE.

Accordingly, in one respect, disclosed herein is a method of controlling service by a base station. As disclosed, the method includes, while the base station is serving both a first UE without carrier aggregation and a plurality of second UEs with carrier aggregation, the base station detecting a trigger event for starting to serve the first UE with carrier aggregation. The method further includes, responsive to detecting the trigger event, the base station selecting one of the second UEs to transition from being served by the base station with carrier aggregation to being served by the base station without carrier aggregation. In accordance with the method, the base station selects the one of the second UEs based at least in part on an MCS that the base station uses to serve the selected one of the second UEs. The method then includes the base station transitioning from serving the selected one of the second UEs with carrier aggregation to serving the selected one of the second UEs without carrier aggregation. And the method further includes the base station transitioning from serving the first UE without carrier aggregation to serving the first UE with carrier aggregation.

In another respect, disclosed is a base station that includes an antenna structure for communicating over an air interface with a first UE and with a plurality of second UEs. The base station further includes a controller configured to carry out various base station operations as described herein. By way of example, the base station operations could include, while the base station serves the first UE without carrier aggregation and serves the plurality of second UEs with carrier aggregation, detecting a trigger event for starting to serve the first UE with carrier aggregation. The base station operations could further include, responsive to detecting the trigger event, selecting one of the second UEs to transition from being served by the base station with carrier aggregation to being served by the base station without carrier aggregation, where the controller selects the one of the second UEs based at least in part on an MCS that the base station uses to serve the selected one of the second UEs. Additionally, the base station operations could include transitioning from serving the selected one of the second UEs with carrier aggregation to serving the selected one of the second UEs without carrier aggregation. And the base station operations could further include transitioning from serving the first UE without carrier aggregation to serving the first UE with carrier aggregation.

Still further, disclosed is another method of controlling service by a base. As disclosed, the method includes, while the base station is serving both a first UE without carrier aggregation and a plurality of second UEs with carrier aggregation and a quantity of the plurality of second UEs is at least a threshold quantity, the base station detecting a trigger event for starting to serve the first UE with carrier aggregation. The method further includes, based on the quantity of the plurality of second UEs being at least the threshold quantity and responsive to the base station detecting the trigger event for starting to serve the first UE with carrier aggregation, the base station selecting one of the second UEs to transition from being served by the base station with carrier aggregation to being served by the base station without carrier aggregation. In accordance with the method, the base station selects the one of the second UEs based at least in part on an MCS that the base station uses to serve the selected one of the second UEs. The method then includes the base station transitioning from serving the selected one of the second UEs with carrier aggregation to serving the selected one of the second UEs without carrier aggregation. And the method further includes, responsive to the base station transitioning from serving the selected one of the second UEs with carrier aggregation to serving the selected one of the second UEs without carrier aggregation, the base station transitioning from serving the first UE without carrier aggregation to serving the first UE with carrier aggregation.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
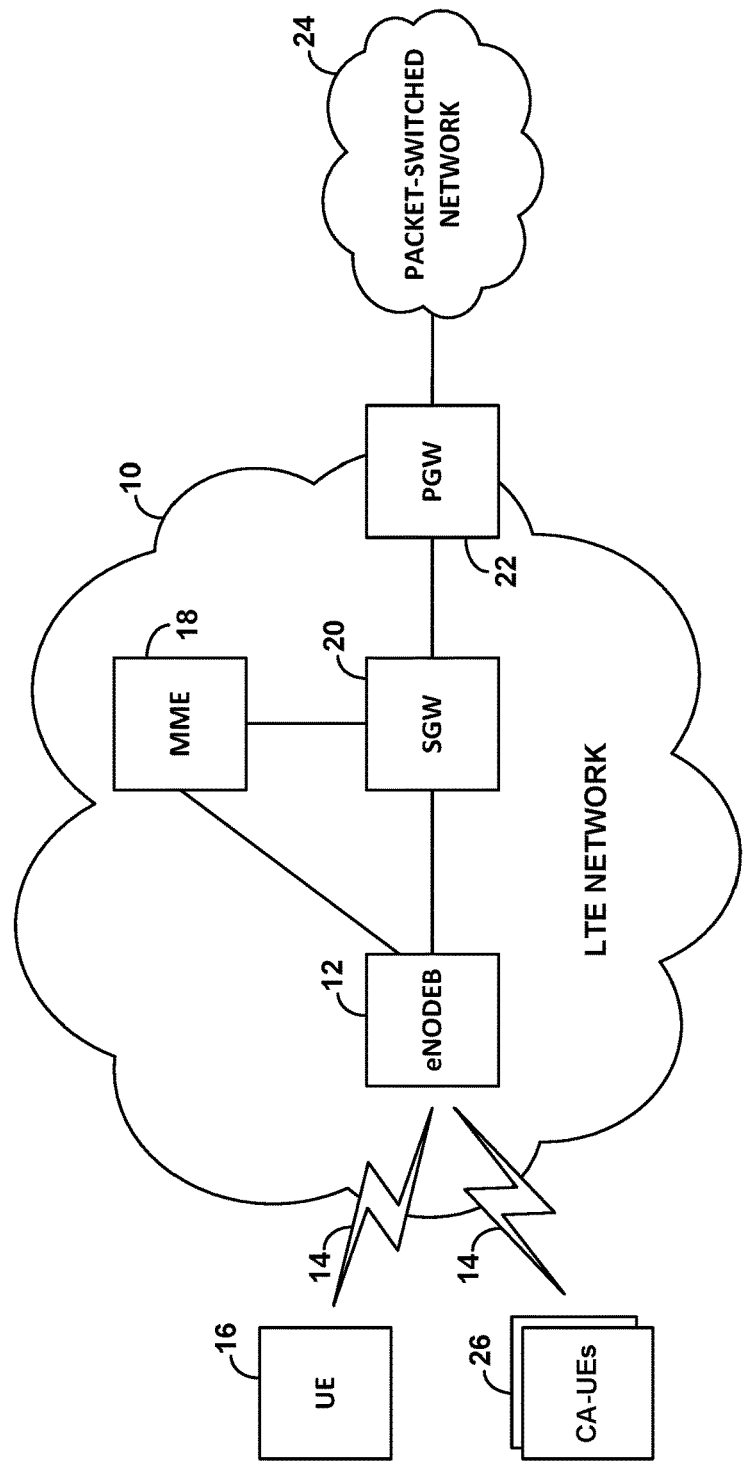
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but could also provide other functions. As shown, the LTE network includes a representative LTE base station (evolved Node-B (eNodeB)) 12, which has an antenna structure and associated equipment for providing an LTE coverage area (air interface) 14 in which to serve UEs such as an example UE 16 as shown. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE network could sit as nodes on a private packet-switched network owned by an operator of the LTE network, and thus the various communication interfaces could be logical interfaces through that network.

In accordance with the LTE standard, each coverage area of eNodeB 12 could operate on one or more carriers spanning 1.4 MHz, 3 MHz, 5 MHz, 10 MHz, 15 MHz, or 20 MHz. Each of these carriers is subdivided in both time and frequency to define an array of resource elements for carrying data between eNodeB 12 and its served UEs. Each resource element can represent a number of bits, with the number of bits depending on how the data is modulated. As noted above, the data could be modulated according to various MCSs having various orders of modulation. For instance, with QPSK modulation, each resource element represents 2 bits; with the higher-order 16QAM, each resource element represents 4 bits; with the even higher-order 64QAM, each resource element represents 6 bits; and with the still higher-order 256QAM, each resource element represents 8 bits.

Further, certain resource elements on the air interface are reserved to define channels for carrying particular types of communications between the eNodeB and UEs. For instance, on the downlink, certain resource elements are reserved to define a control region for carrying control signaling from the eNodeB to UEs, and other resource elements, grouped into resource blocks, are reserved to define a shared channel for carrying scheduled data communications from the eNodeB to particular UEs. And on the uplink, certain resource elements are reserved to define a control region for carrying control signaling from UEs to the eNodeB, and other resource elements, grouped into resource blocks, are reserved to define a shared channel for carrying scheduled data communications from UEs to the eNodeB.

With this arrangement as shown, UE 16 could be attached (i.e., registered) with eNodeB 12 on a single carrier, such as a carrier having a defined frequency bandwidth and structure as described above, and the UE could have one or more established bearers for carrying bearer data between the UE and packet-switched network 24. In such an arrangement, the eNodeB could at times receive, from SGW 20 or other source, packet-data that is destined to the UE, and the eNodeB could then schedule and provide downlink transmission of the data over the air to the UE. And when the UE has data to transmit on the packet-switched network, the UE could transmit a scheduling request over the air to the eNodeB, the eNodeB could schedule uplink transmission of the data, the UE could transmit the data accordingly to the eNodeB, and the data could pass to the SGW and to the PGW, for transmission on the packet-switched network.

As further shown in the illustrated arrangement, eNodeB 12 could be providing carrier aggregation service to a plurality of UEs within coverage area 14, such as example carrier-aggregation-UEs (CA-UEs) 26. In particular, the CA-UEs 26 and eNodeB 12 could have engaged in signaling with each other to establish a radio-link layer connection, as a Radio Resource Control (RRC) connection, that encompasses two or more carriers, and so each of the CA-UEs 26 could be set to communicate with eNodeB 12 concurrently on the two or more carriers. One of these carriers could be deemed a primary component carrier (PCC), and the other carriers could be deemed secondary component carriers (SCCs). Depending on the implementation, the PCC could then carry control signaling for all carriers, or each carrier could carry its own control signaling.

As eNodeB 12 serves CA-UEs 26 in this arrangement, the eNodeB may coordinate transmission of data to and from the CA-UEs concurrently on the multiple carriers. For example, when the eNodeB receives data destined to one of the CA-UEs, the eNodeB may allocate certain downlink resource blocks respectively on each carrier to cooperatively carry the data, and the eNodeB may transmit to the CA-UE one or more control signals designating the allocated downlink resources and transmit the data to the CA-UE in the allocated resources. And when the CA-UE has data to transmit, the CA-UE may send a scheduling request control signal to the eNodeB, the eNodeB may allocate certain uplink shared channel resource blocks respectively on each carrier to cooperatively carry the data and may transmit to the CA-UE one or more control signals designating the allocated uplink resources, and the CA-UE may transmit the data to the eNodeB in the allocated resources.

In practice, each carrier on which an eNodeB serves a UE will have a limited supply of resource elements for transmitting data between the eNodeB and the UE. In order to help fairly manage data transmission resources given this limitation, the eNodeB may be configured to impose a per-UE data transmission rate cap when air interface resources are in high use. When applying such a rate cap on the carrier, as the eNodeB or UE is supplied with data packets for transmission on the carrier, the eNodeB may limit the rate of transmission of that data to be no greater than the rate cap.

As such, there may be situations in which the eNodeB or the UE is supplied with data for transmission on the carrier faster than the supplied data can be transmitted. In particular, if the data is supplied at a greater rate than the rate cap, then the supplied data can be transmitted at or below the capped rate while buffering any excess data (e.g., data supplied at a rate that exceeds the rate cap). For this purpose, the eNodeB and the UE may establish and maintain in physical data storage a respective data buffer for temporarily storing such excess data for some time until air interface resources become available for transmitting the stored data.

Ideally, the rate at which the eNodeB or UE accumulates excess data for transmission will vary over time, so that the extent of buffered data will not grow out of control, keeping buffer times low. However, this may not always be the case. Therefore, to help manage the extent of data stored in the data buffer of the eNodeB or the UE, the eNodeB could be configured to take measures to increase data throughput between the eNodeB and the UE if the data buffer of the eNodeB or the UE becomes threshold full (e.g., if the quantity of data stored in the data buffer exceeds a predefined quantity).

As noted above, providing carrier aggregation service to utilize multiple carriers for cooperatively carrying data between a CA-UE and an eNodeB can increase data throughput between the CA-UE and the eNodeB. As such, eNodeB 12 could be configured to invoke carrier aggregation service for UE 16 responsive to determining that at least a threshold quantity of data is buffered for transmission between eNodeB 12 and UE 16. By way of example, eNodeB 12 could make such a determination by referring to its own data buffer and determining that the data buffer contains at least a predefined quantity of data buffered for transmission to UE 16. Alternatively or additionally, eNodeB 12 could receive a status report from UE 16 indicating a quantity of data buffered for transmission to eNodeB 12, and eNodeB 12 could determine that the indicated quantity of data exceeds a predefined quantity. In any case, eNodeB 12 could then invoke carrier aggregation service for UE 16, thereby increasing data throughput between the eNodeB and the UE and reducing the quantity of data stored in the data buffer of eNodeB 12 and/or UE 16.

However, as further noted above, computational or other limitations of eNodeB 12 could impose an upper limit on the quantity of UEs that the eNodeB can provide with carrier aggregation service at any given time. If, while providing carrier aggregation services to such a maximum quantity of UEs, eNodeB 12 detects a trigger event for invoking carrier aggregation service for UE 16, such as by determining that at least a threshold quantity of data is buffered for transmission between eNodeB 12 and UE 16, then eNodeB 12 could be unable to provide carrier aggregation service for UE 16 due to the carrier aggregation limitations of eNodeB 12.

In such a scenario where the eNodeB detects a trigger event for invoking carrier aggregation service to one of its served UEs while the eNodeB provides carrier aggregation services to a predefined threshold quantity of UEs, the eNodeB could be configured to select one of its served CA-UEs and disable carrier aggregation service for the selected CA-UE in order to provide carrier aggregation service to the UE for which the trigger event was detected. To disable carrier aggregation, the eNodeB could reconfigure the selected CA-UE's service to be on just a single carrier, perhaps by sending the CA-UE an RRC connection reconfiguration message that instructs the UE to release all of its secondary carriers. As such, the CA-UE would transition from being served with carrier aggregation on multiple carriers to being served without carrier aggregation on a single carrier.

In the context of FIG. 1, eNodeB 12 could be serving UE 16 on a single carrier while providing carrier aggregation services to a predefined maximum quantity of CA-UEs 26, and eNodeB 12 could detect a trigger event for invoking carrier aggregation service for UE 16, such as by determining that at least a threshold quantity of data is buffered for transmission between eNodeB 12 and UE 16. Responsive to detecting the trigger event, eNodeB 12 could disable carrier aggregation service for one of the CA-UEs 26, thereby reducing the quantity of CA-UEs 26 below the predefined maximum quantity. Given this reduction in quantity of CA-UEs 26, eNodeB 12 could then invoke carrier aggregation services for UE 16 as discussed above.

In practice, eNodeB 12 could use a variety of considerations as a basis for selecting a particular one of CA-UEs 26 for disabling carrier aggregation services. As noted above, for instance, eNodeB 12 could make such a selection based on the MCSs that eNodeB 12 uses to serve each of CA-UEs 26. In particular, eNodeB 12 could make the selection based on determining which one or ones of the CA-UEs 26 that eNodeB 12 serves using an MCS with at least a threshold high order of modulation. By way of example, eNodeB 12 could identify which CA-UEs 26 eNodeB 12 serves using 256QAM, and eNodeB 12 could select one of the identified CA-UEs and disable carrier aggregation service for the selected CA-UE.

Disabling carrier aggregation service for a UE that an eNodeB serves using a higher-order MCS rather than disabling carrier aggregation service for a UE that the eNodeB serves using a lower-order MCS could be advantageous, because serving a UE with a higher-order MCS allows for faster data throughput between the UE and the eNodeB. In particular, as noted above, modulating data using a higher-order MCS rather than a lower-order MCS allows for each resource element on the air interface between the UE and the eNodeB to represent a greater amount of data. And transmitting more data in each resource element could provide a greater rate of data transmission between the UE and the eNodeB. Further, as noted above, an eNodeB typically provides a UE with carrier aggregation service in order to increase the data throughput between the eNodeB and the UE. And a UE that is served using a higher-order MCS could have sufficiently high data throughput with the eNodeB merely from using the higher-order MCS, such that the UE is in less need of additional throughput provided by carrier aggregation service. Accordingly, the eNodeB could be configured to disable carrier aggregation service for a UE that the eNodeB serves using the highest-order MCS or that the eNodeB serves using an MCS with at least a threshold high order of modulation.

In some examples, the eNodeB could also consider an amount of data that is buffered for transmission between the eNodeB and each of its served UEs when selecting a particular UE for disabling carrier aggregation service. In particular, eNodeB 12 could identify which one(s) of CA-UEs 26 that eNodeB 12 serves using an MCS with at least a threshold high order of modulation as discussed above. And of those identified CA-UEs, eNodeB 12 could determine for each CA-UE an amount of data buffered for transmission to or from eNodeB 12. By way of example, eNodeB 12 could make such a determination by referring to its own data buffer for each of the identified CA-UEs and/or, as noted above, by referring to status reports received from each of the identified CA-UEs, where the status reports indicate quantities of data buffered for transmission from the CA-UEs to eNodeB 12. The eNodeB could then select one of the identified CA-UEs based on the CA-UE having a threshold low quantity of data buffered for transmission to or from the eNodeB. For instance, eNodeB 12 could select the CA-UE with the least amount of data buffered for transmission to or from eNodeB 12. Then eNodeB 12 could disable carrier aggregation service for the selected CA-UE by transitioning from serving the selected CA-UE on multiple carriers to serving the selected CA-UE on a single carrier, and eNodeB 12 could enable carrier aggregation service for UE 16 by transitioning from serving UE 16 on a single carrier to serving UE 16 on two or more carriers, as discussed above.

It could be advantageous to disable carrier aggregation service for a UE that has a low quantity of data buffered for transmission to or from the eNodeB rather than disabling carrier aggregation service for a UE that has a high quantity of data buffered for transmission to or from the eNodeB. In particular, as noted above, carrier aggregation service is often provided to a UE in order to increase the data throughput between the eNodeB and the UE. If a UE has a low quantity of data buffered for transmission to or from the eNodeB, then this could indicate that the UE is in less need of additional throughput provided by carrier aggregation service. On the other hand, if a UE has a high quantity of data buffered for transmission to or from the eNodeB, then this could indicate that the UE is in more need of additional throughput provided by carrier aggregation service. Accordingly, the eNodeB could be further configured to disable carrier aggregation service for a UE that has a threshold low quantity of data buffered for transmission to or from the eNodeB. In practice, for instance, eNodeB 12 could select a particular one of CA-UEs 26 based on the selected CA-UE (i) being served by eNodeB 12 with an MCS having a threshold high order of modulation and (ii) having a threshold low quantity of data buffered for transmission to or from eNodeB 12.

In other examples, the eNodeB could additionally or alternatively consider a channel quality of the air interface between the eNodeB and each of its served UEs when selecting a particular UE for disabling carrier aggregation service. In particular, eNodeB 12 could identify which one(s) of CA-UEs 26 that eNodeB 12 serves using an MCS with at least a threshold high order of modulation as discussed above. And of those identified CA-UEs, eNodeB 12 could determine for each CA-UE a channel quality of the air interface between each CA-UE and eNodeB 12. By way of example, eNodeB 12 could receive from each CA-UE a channel quality indicator (CQI) indicating each CA-UE's determined channel quality, where the CQI could be based on a signal-to-noise ratio of a reference signal from the eNodeB as detected by each CA-UE. The eNodeB could then select one of the identified CA-UEs based on the CA-UE having a threshold high channel quality with the eNodeB. For instance, eNodeB 12 could select the CA-UE having the highest indicated channel quality with eNodeB 12. Then eNodeB 12 could disable carrier aggregation service for the selected CA-UE by transitioning from serving the selected CA-UE on multiple carriers to serving the selected CA-UE on a single carrier, and eNodeB 12 could enable carrier aggregation service for UE 16 by transitioning from serving UE 16 on a single carrier to serving UE 16 on two or more carriers, as discussed above.

It could be advantageous to disable carrier aggregation service for a UE that has a high channel quality with the eNodeB rather than disabling carrier aggregation service for a UE that has a low channel quality with the eNodeB. In particular, a UE detecting a high channel quality from an eNodeB could have higher data throughput with the eNodeB than a UE detecting a low channel quality from the eNodeB. By way of example, a low channel quality could increase the likelihood of signal noise or other sources of interference preventing the UE or the eNodeB from receiving and demodulating data from each other. And if the UE or eNodeB fails to receive and demodulate the data, then the transmitting entity could end up engaging in a number of retransmission attempts of the data, thereby delaying the transmission of the data and reducing overall data throughput between the eNodeB and the UE. As such, a UE that detects a high channel quality on its air interface with the eNodeB could have a higher data throughput with the eNodeB and, therefore, could be in less need of additional throughput provided by carrier aggregation service. Accordingly, the eNodeB could be further configured to disable carrier aggregation service for a UE that detects a threshold high channel quality on its air interface with the eNodeB. In practice, for instance, eNodeB 12 could select a particular one of CA-UEs 26 based on the selected CA-UE (i) being served by eNodeB 12 with an MCS having a threshold high order of modulation and (ii) detecting a threshold high channel quality on the air interface with eNodeB 12.

Still in other examples, when selecting a particular CA-UE for which to disable carrier aggregation, the eNodeB could consider the MCSs that the eNodeB uses to serve each of its served CA-UEs, the quantity of data buffered for transmission between the eNodeB and each of its served CA-UEs, and the channel quality detected by each of its served CA-UEs. For instance, eNodeB 12 could select a particular one of CA-UEs 26 based on the selected CA-UE (i) being served by eNodeB 12 with an MCS having a threshold high order of modulation, (ii) having a threshold low quantity of data buffered for transmission to or from eNodeB 12, and (iii) detecting a threshold high channel quality on the air interface with eNodeB 12. Then eNodeB 12 could disable carrier aggregation service for the selected CA-UE by transitioning from serving the selected CA-UE on multiple carriers to serving the selected CA-UE on a single carrier, and eNodeB 12 could enable carrier aggregation service for UE 16 by transitioning from serving UE 16 on a single carrier to serving UE 16 on two or more carriers, as discussed above.

Figure 2:
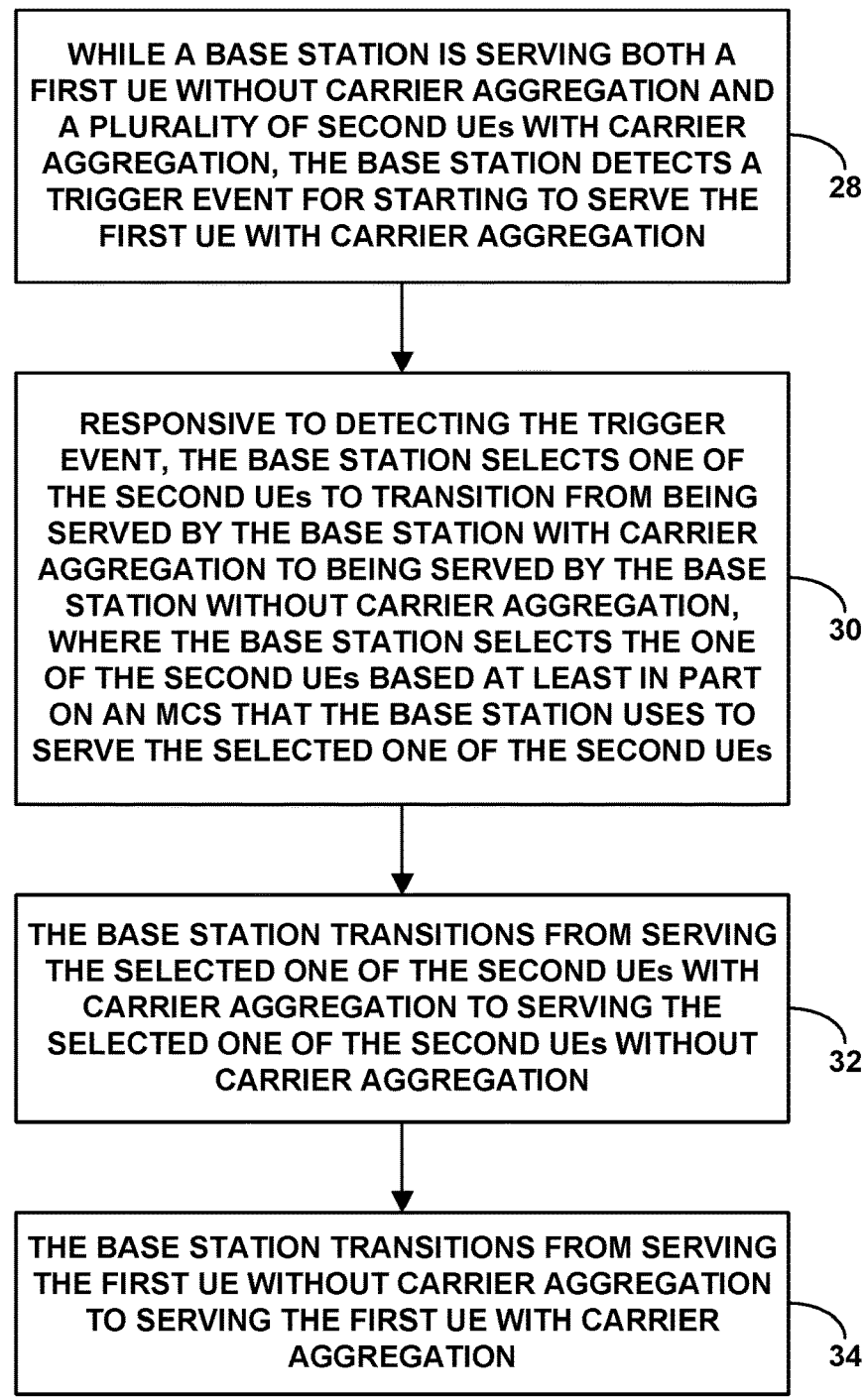
FIG. 2 is a flow chart depicting example operations in accordance with the disclosure.

FIG. 2 is a flow chart depicting a method that could be carried out by a representative base station. As shown in FIG. 2, at block 28, the method involves, while the base station is serving both a first UE without carrier aggregation and a plurality of second UEs with carrier aggregation, the base station detecting a trigger event for starting to serve the first UE with carrier aggregation. At block 30, the method then involves, responsive to detecting the trigger event, the base station selecting one of the second UEs to transition from being served by the base station with carrier aggregation to being served by the base station without carrier aggregation, where the base station selects the one of the second UEs based at least in part on an MCS that the base station uses to serve the selected one of the second UEs. Then at block 32, the method involves the base station transitioning from serving the selected one of the second UEs with carrier aggregation to serving the selected one of the second UEs without carrier aggregation. And at block 34, the method involves the base station transitioning from serving the first UE without carrier aggregation to serving the first UE with carrier aggregation.

In line with the discussion above, the base station detecting the trigger event for starting to serve the first UE with carrier aggregation could involve the base station determining that at least a threshold quantity of data is buffered for transmission between the base station and the first UE.

Further in line with the discussion above, the base station selecting the one of the second UEs based at least in part on the MCS that the base station uses to serve the selected one of the second UEs could involve the base station selecting the one of the second UEs based on the modulation order of the MCS being at least a threshold high order. Additionally, the base station could select the one of the second UEs further based on (i) a quantity of data buffered for transmission between the base station and the one of the second UEs and/or (ii) a channel quality of an air interface between the base station and the one of the second UEs. For instance, the base station could select the one of the second UEs based on the base station determining that (i) the quantity of data buffered for transmission between the base station and the one of the second UEs is less than a predefined quantity and/or (ii) the channel quality of the air interface between the base station and the one of the second UEs is at least a predefined channel quality.

Figure 3:
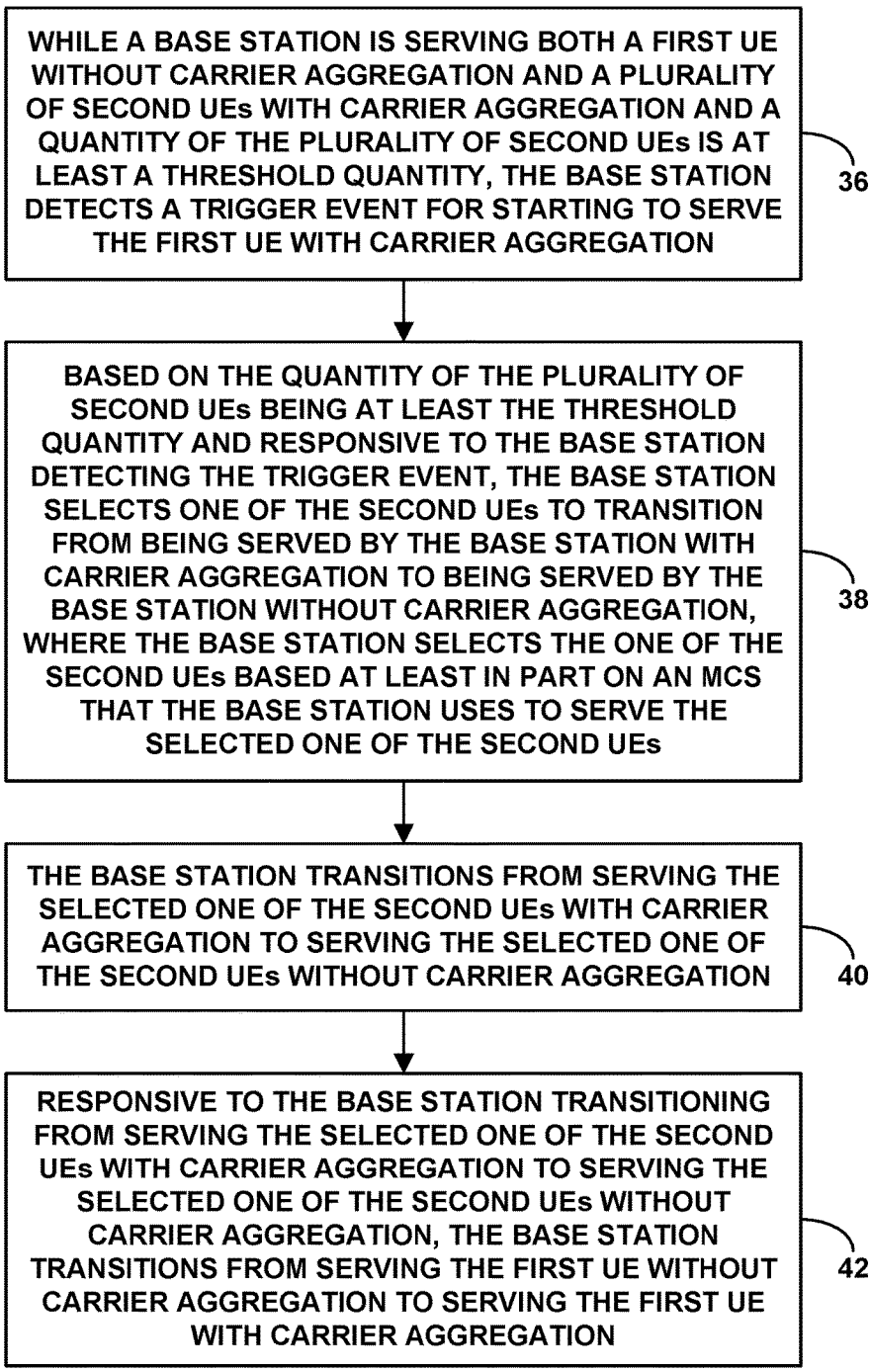
FIG. 3 is another flow chart depicting example operations in accordance with the disclosure.

FIG. 3 is a flow chart depicting an alternative embodiment of the method that could be carried out by a representative base station. As shown in FIG. 3, at block 36, the method involves, while the base station is serving both a first UE without carrier aggregation and a second UE with carrier aggregation and a quantity of the plurality of second UEs is at least a threshold quantity, the base station detecting a trigger event for starting to serve the first UE with carrier aggregation. And at block 38, the method involves, based on the quantity of the plurality of second UEs being at least the threshold quantity and responsive to the base station detecting the trigger event, the base station selecting one of the second UEs to transition from being served by the base station with carrier aggregation to being served by the base station without carrier aggregation, where the base station selects the one of the second UEs based at least in part on an MCS that the base station uses to serve the selected one of the second UEs. Then at block 40, the method involves the base station transitioning from serving the selected one of the second UEs with carrier aggregation to serving the selected one of the second UEs without carrier aggregation. And at block 42, the method involves the base station, responsive to transitioning from serving the selected one of the second UEs with carrier aggregation to serving the selected one of the second UEs without carrier aggregation, transitioning from serving the first UE without carrier aggregation to serving the first UE with carrier aggregation.

Again, in line with the discussion above, the base station detecting the trigger event for starting to serve the first UE with carrier aggregation could involve the base station determining that at least a threshold quantity of data is buffered for transmission between the base station and the first UE.

Likewise, the base station selecting the one of the second UEs based at least in part on the MCS that the base station uses to serve the selected one of the second UEs could involve the base station selecting the one of the second UEs based on the modulation order of the MCS being at least a threshold high order. Additionally, the base station could select the one of the second UEs further based on (i) a quantity of data buffered for transmission between the base station and the one of the second UEs and/or (ii) a channel quality of an air interface between the base station and the one of the second UEs. For instance, the base station could select the one of the second UEs based on the base station determining that (i) the quantity of data buffered for transmission between the base station and the one of the second UEs is less than a predefined quantity and/or (ii) the channel quality of the air interface between the base station and the one of the second UEs is at least a predefined channel quality.

Figure 4:
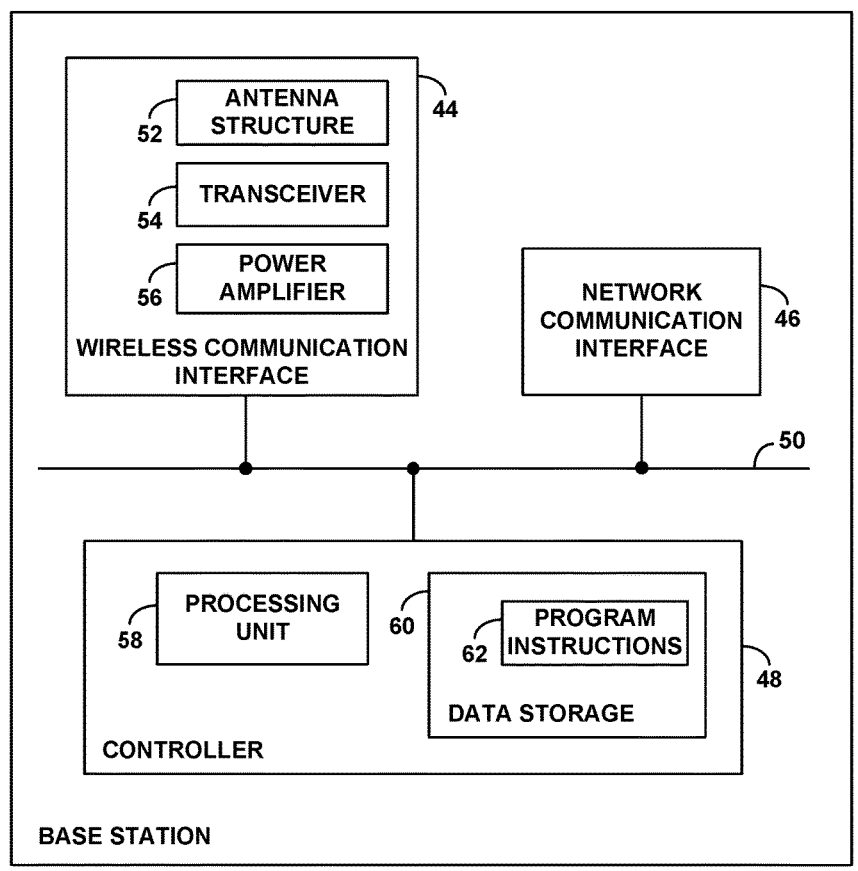
FIG. 4 is a simplified block diagram of an example base station operable in accordance with the disclosure.

Finally, FIG. 4 is a simplified block diagram of an example base station, showing some of the components that each of the base stations in FIG. 1 could include in an example implementation. As shown in FIG. 4, the base station includes a wireless communication interface 44, a network communication interface 46, and a controller 48. These components are shown communicatively linked together by a system bus or other communication link 50, but it will be understood that the components could alternatively be integrated together or distributed in various ways. For instance, aspects of the controller 48 could be provided in a chipset that implements functions of the wireless communication interface 44. Other examples are possible as well.

As shown, wireless communication interface 44 could include an antenna structure (e.g., one or more antennas) 52, which, together with a power amplifier 54 and a transceiver 56, facilitates air interface communication (transmitting and receiving), so that the base station can serve one or more UEs via the wireless communication interface. Network communication interface 46 could then include a wired or wireless network interface, such as an Ethernet interface, through which the base station could communicate with other entities via a core network or the like.

Controller 48 could include a processing unit (one or more processors) 58, non-transitory data storage 60, and program instructions 62 stored in the non-transitory data storage and executable by the processing unit to carry out various operations described herein. For instance, the controller could be configured to cause the base station to carry out the operations of (i) while the base station is serving both a first UE without carrier aggregation and a plurality of second UEs with carrier aggregation, detecting a trigger event for starting to serve the first UE with carrier aggregation, (ii) responsive to detecting the trigger event, selecting one of the second UEs to transition from being served by the base station with carrier aggregation to being served by the base station without carrier aggregation, where the controller selects the one of the second UEs based at least in part on an MCS that the base station uses to serve the selected one of the second UEs, (iii) transitioning from serving the selected one of the second UEs with carrier aggregation to serving the selected one of the second UEs without carrier aggregation, and (iv) transitioning from serving the first UE without carrier aggregation to serving the first UE with carrier aggregation. Further, other operations, factors, and features described above could be carried out in this context as well.

Exemplary embodiments have been described above. Those skilled in the art will understand, however, that changes and modifications may be made to these embodiments without departing from the true scope and spirit of the invention.

We claim:

1. A method of controlling service by a base station, the method comprising:

while the base station is serving both a first user equipment device (UE) without carrier aggregation and a plurality of second UEs with carrier aggregation, the base station detecting a trigger event for starting to serve the first UE with carrier aggregation; and responsive to detecting the trigger event, (i) the base station selecting one of the second UEs to transition from being served by the base station with carrier aggregation to being served by the base station without carrier aggregation, wherein the base station selects the one of the second UEs based at least in part on a modulation and coding scheme (MCS) that the base station uses to serve the selected one of the second UEs, (ii) the base station transitioning from serving the selected one of the second UEs with carrier aggregation to serving the selected one of the second UEs without carrier aggregation, and (iii) the base station transitioning from serving the first UE without carrier aggregation to serving the first UE with carrier aggregation.

2. The method of claim 1, wherein the trigger event for starting to serve the first UE with carrier aggregation comprises a determination that at least a threshold quantity of data is buffered for transmission between the base station and the first UE.

3. The method of claim 1, wherein the base station selects the one of the second UEs based at least in part on a determination that a modulation order of the MCS that the base station uses to serve the selected one of the second UEs is at least a threshold high modulation order.

4. The method of claim 3, wherein the base station transitions from serving the selected one of the second UEs with carrier aggregation to serving the selected one of the second UEs without carrier aggregation responsive to the determination that the modulation order of the MCS that the base station uses to serve the selected one of the second UEs is at least the threshold high modulation order.

5. The method of claim 1, wherein the base station selects the one of the second UEs based at least further in part on a quantity of data buffered for transmission between the base station and the one of the second UEs.

6. The method of claim 5, wherein the base station selects the one of the second UEs based on both (i) a determination that a modulation order of the MCS that the base station uses to serve the selected one of the second UEs is at least a threshold high modulation order and (ii) a determination that the quantity of data buffered for transmission between the base station and the one of the second UEs is less than a predefined quantity.

7. The method of claim 1, wherein the base station selects the one of the second UEs based at least further in part on a channel quality of an air interface between the base station and the one of the second UEs.

8. The method of claim 7, wherein the base station selects the one of the second UEs based on both (i) a determination that a modulation order of the MCS that the base station uses to serve the selected one of the second UEs is at least a threshold high modulation order and (ii) a determination that the channel quality of the air interface is at least a predefined channel quality.

9. The method of claim 1, wherein the base station selects the one of the second UEs based further in part on (i) a quantity of data buffered for transmission between the base station and the one of the second UEs and (ii) a channel quality of an air interface between the base station and the one of the second UEs.

10. The method of claim 1, wherein the base station selects the one of the second UEs based on (i) a determination that a modulation order of the MCS that the base station uses to serve the selected one of the second UEs is at least a threshold high modulation order, (ii) a determination that the quantity of data buffered for transmission between the base station and the one of the second UEs is less than a predefined quantity, and (iii) a determination that the channel quality of the air interface is at least a predefined channel quality.

11. The method of claim 1, wherein the base station transitions from serving the first UE without carrier aggregation to serving the first UE with carrier aggregation responsive to the base station transitioning from serving the selected one of the second UEs with carrier aggregation to serving the selected one of the second UEs without carrier aggregation.

12. A base station comprising:
an antenna structure for communicating over an air interface with a first user equipment device (UE) and with a plurality of second UEs; and
a controller configured to carry out operations comprising:
while the base station serves the first UE without carrier aggregation and serves the plurality of second UEs with carrier aggregation, detecting a trigger event for starting to serve the first UE with carrier aggregation; and responsive to detecting the trigger event, (i) selecting one of the second UEs to transition from being served by the base station with carrier aggregation to being served by the base station without carrier aggregation, wherein the controller selects the one of the second UEs based at least in part on a modulation and coding scheme (MCS) that the base station uses to serve the selected one of the second UEs, (ii) transitioning from serving the selected one of the second UEs with carrier aggregation to serving the selected one of the second UEs without carrier aggregation, and (iii) transitioning from serving the first UE without carrier aggregation to serving the first UE with carrier aggregation.

13. The base station of claim 12, wherein the controller selects the one of the second UEs based at least in part on a determination that a modulation order of the MCS that the base station uses to serve the selected one of the second UEs is at least a threshold high modulation order.

14. The base station of claim 12, wherein the controller selects the one of the second UEs based at least further in part on a quantity of data buffered for transmission between the base station and the one of the second UEs.

15. The base station of claim 14, wherein the controller selects the one of the second UEs based on both (i) a determination that a modulation order of the MCS that the base station uses to serve the selected one of the second UEs is at least a threshold high modulation order and (ii) a determination that the quantity of data buffered for transmission between the base station and the one of the second UEs is less than a predefined quantity.

16. The base station of claim 12, wherein the controller selects the one of the second UEs based at least further in part on a channel quality of an air interface between the base station and the one of the second UEs.

17. The base station of claim 16, wherein the controller selects the one of the second UEs based on both (i) a determination that a modulation order of the MCS that the base station uses to serve the selected one of the second UEs is at least a threshold high modulation order and (ii) a determination that the channel quality of the air interface is at least a predefined channel quality.

18. The base station of claim 12, wherein the controller selects the one of the second UEs based further in part on (i) a quantity of data buffered for transmission between the base station and the one of the second UEs and (ii) a channel quality of an air interface between the base station and the one of the second UEs.

19. The base station of claim 12, wherein the controller selects the one of the second UEs based on (i) a determination that a modulation order of the MCS that the base station uses to serve the selected one of the second UEs is at least a threshold high modulation order, (ii) a determination that the quantity of data buffered for transmission between the base station and the one of the second UEs is less than a predefined quantity, and (iii) a determination that the channel quality of the air interface is at least a predefined channel quality.

20. A method of controlling service by a base station, the method comprising:
while the base station is serving both a first user equipment device (UE) without carrier aggregation and a plurality of second UEs with carrier aggregation and a quantity of the plurality of second UEs is at least a threshold quantity, the base station detecting a trigger event for starting to serve the first UE with carrier aggregation;

based on the quantity of the plurality of second UEs being at least the threshold quantity and responsive to the base station detecting the trigger event for starting to serve the first UE with carrier aggregation, the base station selecting one of the second UEs to transition from being served by the base station with carrier aggregation to being served by the base station without carrier aggregation, wherein the base station selects the one of the second UEs based at least in part on a modulation and coding scheme (MCS) that the base station uses to serve the selected one of the second UEs;

the base station transitioning from serving the selected one of the second UEs with carrier aggregation to serving the selected one of the second UEs without carrier aggregation; and responsive to the base station transitioning from serving the selected one of the second UEs with carrier aggregation to serving the selected one of the second UEs without carrier aggregation, the base station transitioning from serving the first UE without carrier aggregation to serving the first UE with carrier aggregation.

* * * * *